Jan. 2, 1968   J. E. BARNERIAS   3,360,909
FILTERING APPARATUS FOR GASEOUS FLUIDS
Filed Feb. 1, 1965   2 Sheets-Sheet 1

INVENTOR
JEAN EMILE BARNERIAS
BY Bailey, Stephens &
Huettig
ATTORNEYS

United States Patent Office 3,360,909
Patented Jan. 2, 1968

3,360,909
FILTERING APPARATUS FOR GASEOUS FLUIDS
Jean Émile Barnerias, Rueil-Malmaison, France, assignor to Precision Mecanique Labinal, Saint-Ouen, Hauts-de-Seine, France, a society of France
Filed Feb. 1, 1965, Ser. No. 429,395
Claims priority, application France, Feb. 6, 1964, 962,879
2 Claims. (Cl. 55—348)

The present invention relates to filtering apparatus for gaseous fluids of the type wherein the fluid is caused to pass through filtering cells in the form of bodies of revolution made of at least two distinct portions fitting end to end in each other and wherein said fluid is subjected to a gyrating effect which separates, by centrifugal action, the dust particles toward the outside.

The chief object of the present invention is to provide a filtering apparatus of this kind which is of easier construction and mounting.

In such filtering apparatus the filtering cells are disposed in at least one box for collecting at least a portion of the dust particles issuing from the filtering cells. According to the present invention, said collecting box consists of at least two portions adapted to be assembled together in a fluidtight fashion as a consequence of the manner in which the filtering cell portions are assembled.

Said filtering cells may be made of a plastic material such as those designated by the trademarks Delrin, Rilsan, nylon and Bakelite.

Preferred embodiments of the present invention will be hereinafter described with reference to the appended drawings, given merely by way of example, and in which.

The invention can be applied to the filtering of air or any other gas containing dust in suspension therein, for all kinds of machines, for instance public work apparatus, agricultural machines, climatizing plants for buildings, automobile vehicles and so on.

Figure 1:
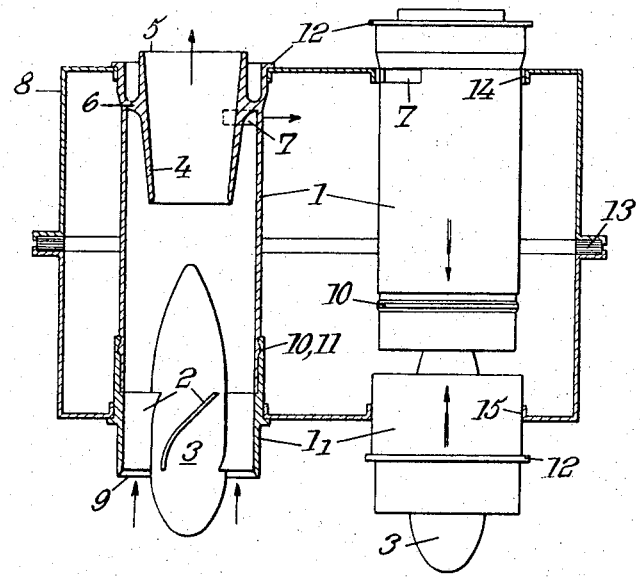
FIG. 1 is a sectional view, partly in elevation of a filtering apparatus made according to a first embodiment of the invention, the right hand side of this figure showing the elements of a filtering cell before they are assembled together and the left hand side of this figure showing said elements fitted in each other.
Figure 2:
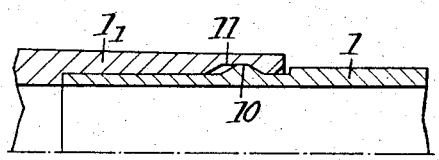
FIG. 2 shows, on an enlarged scale, a cross section of the assembly of the elements of the filtering cell.
Figure 3:
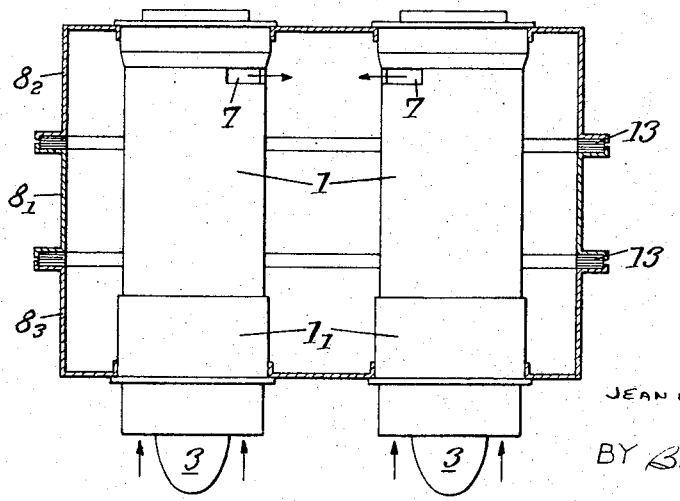
FIG. 3 is a view analogous to FIG. 1 but concerning a modification.
Figure 4:
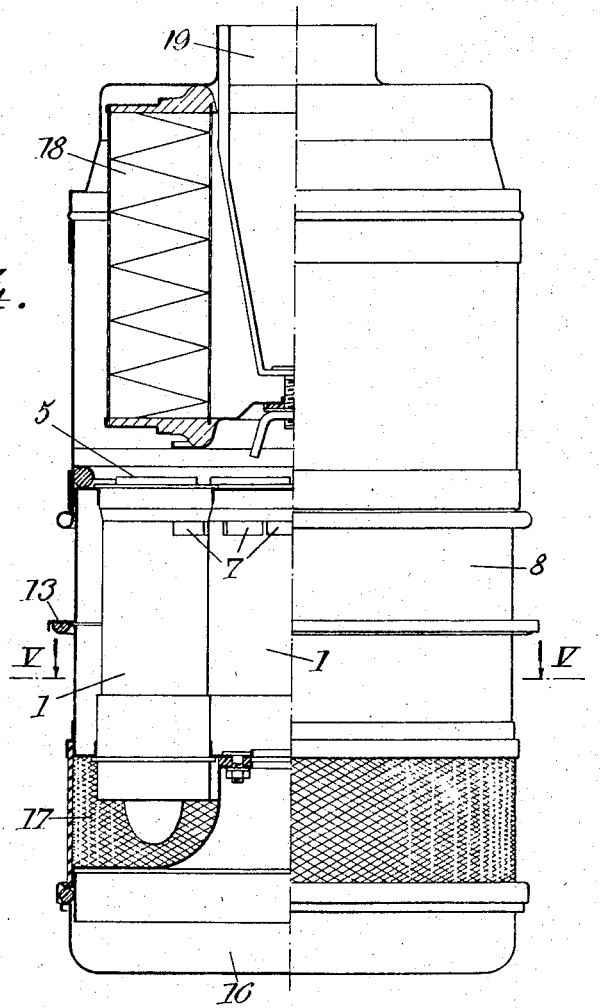
FIG. 4 shows, half in sectional view and half in elevational view, a filtering apparatus made according to another embodiment of the invention.
Figure 5:
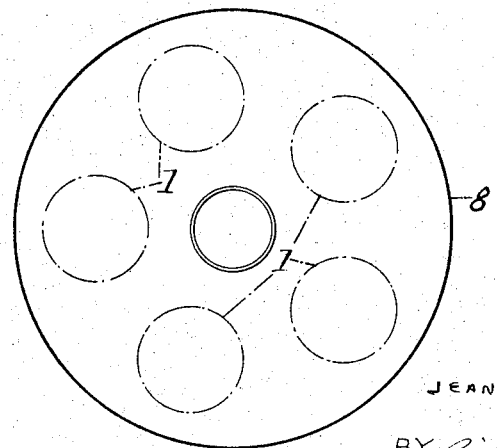
FIG. 5 is a sectional view on the line V—V of FIG. 4.

The filtering cells include centrifugating means either alone as shown by FIGS. 1 to 3 inclusive or in combination with filtering elements making use of a porous material, as shown by FIGS. 4 and 5.

In the embodiment illustrated by FIGS. 1 to 3 the filtering cells essentially comprise a tubular body 1 though which passes the fluid to be treated, which arrives through inlet 9, in combination with blades 2 carried by a streamlined support 3, so as to produce a gyrating movement of the fluid, which flows out through the inner tubular element 4, advantageously of conical shape, the purified fluid being delivered at 5. The dust particles separated by the centrifugal effect strike the inner surface of filtering element 1 until they meet an annular partition 6 which leads them, through outlet orifices 7, into a dust box 8 surrounding cells 1, 4.

In order to make said box 8 and to ensure the mounting of the filtering cells in this box, according to the present invention, Filtering box 8 consists of at least two portions disposed end to end and assembled together in a fluidtight manner, Said portions of this box being kept in this assembled position as a consequence of the mounting of the filtering cells.

As shown by the drawings, every filtering cell is made of two portions 1, $1_1$ adapted to fit in each other at 10, 11 (FIGS. 1 and 2) and provided at their respective ends with flanges 12 (FIG. 1) adapted to bear against the edges of holes 14, 15 provided in the walls of box 8.

FIG. 1 illustrates an embodiment of the invention wherein the box 8 in which dust is collected essentially consists of two portions adapted to be applied against each other with the insertion between them of a packing joint 13, for instance of resilient material such as rubber, the pressure with which said joint is compressed being obtained as a consequence of the assembly of the portions 1 and $1_1$ of the tubular body.

The assembly of elements 1 and $1_1$ can be performed in any suitable manner, for instance by screwing, but it is more advantageous to obtain this assembly by deformation and fitting of the parts in each other. Preferably in this case the cells are made of a plastic material of the kind of those designated by the trademarks Delrin, Rilsan, nylon and Bakelite.

In this case, one of the cell portions, for instance 1, is provided with an annular projection 10 adapted to cooperate with an annular groove 11 provided in the other cell portion $1_1$.

In these conditions, the two elements 1 and $1_1$ will be first engaged in holes 14 and 15 respectively, as shown by the right hand side of FIG. 1 and then pushed toward each other until annular projection 10 is engaged in annular groove 11, as shown by the left hand side of FIG. 1.

In this position the two halves of dust box 8 are pressed toward each other by the flanges 12 of filtering cells 1, $1_1$ bearing against the edges of holes 14 and 15 and packing joint 13 is compressed between the flanges of said dust box 8.

Of course the structure shown by FIG. 1 for box 8 may be different and, for instance as illustrated by FIG. 3, said box may include three portions $8_1$, $8_2$ and $8_3$.

Of course it will be necessary to evacuate the dust accumulating in box 8.

It should be noted that the inside of said box 8 is normally under a pressure lower than atmospheric pressure so that it should be made fluidtight. This is shown by FIG. 4 where box 8 is provided at its lower part with a fluidtight compartment 16 removable for removal of the dust.

In the arrangement illustrated by FIG. 4, air reaches the filtering cells by passing through gratings 17.

FIGS. 4 and 5 illustrate an embodiment of the invention in which the air issuing from the filtering cells at 5 is made to pass through a filter 18 of a usual type made of impregnated paper or another material of the same kind to flow out at 19.

The construction according to the present invention permits an easy assembly of the parts and it also ensures a relatively low cost of the construction owing to the possibility of using plastic material for making the filtering elements.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A filtering apparatus for a fluid containing dust particles in suspension therein, which comprises, in combination:

at least one filtering cell including a body of revolution about an axis and means for imparting a gyrating motion to said fluid about said axis, said body being provided with at least one axial orifice for the outflow of said fluid and one peripheral outlet orifice for the outflow of dust particles separated from said fluid, a dust box surrounding said filtering cell for receiving the dust evacuated therefrom through said peripheral outlet orifice, said filtering cell body being made of at least two distinct portions, each made of a single piece, fitting in each other along cooperating respective continuous surfaces thereof surrounding said axis, this fitting being obtained by relative movement of said portions toward each other in a direction parallel to said axis, cooperating means carried by said portions for holding them together in such fitted relationship, said dust box including at least two portions in line with each other and provided with repsective annular flanges of the same radius running along their edges located opposite each other, an annular packing member of a resilient material fitting between said flanges, and cooperating abutment means carried by each of said filtering cell portions and of said dust box portions, respectively, and assembled so as to compress said packing member between the flanges in response to the fitting of said filtering cell portions in each other, whereby to keep said dust box fluidtight.

2. A filtering apparatus according to claim 5 wherein said cooperating holding means of said filtering cell portions are in the form of an annular groove of revolution about said axis provided in one of said two cell portions and an annular projection carried by the other of said two cell portions and adapted to engage said annular groove with a force fit.

References Cited

UNITED STATES PATENTS

| | | | |
|---|---|---|---|
| 2,392,872 | 1/1946 | Wolfe | 55—345 |
| 2,662,610 | 12/1953 | Heinrich | 55—452 X |
| 2,887,177 | 5/1959 | Mund et al. | 55—348 X |
| 2,889,008 | 6/1959 | Copp et al. | 55—348 |
| 2,994,404 | 8/1961 | Schifferly | 55—359 X |

FOREIGN PATENTS 901,290   7/1962   Great Britain.

HARRY B. THORNTON, *Primary Examiner.*

S. W. SOKOLOFF, R. F. BURNETT,
*Assistant Examiners.*